US009191051B1

(12) United States Patent
Narasimhan et al.

(10) Patent No.: US 9,191,051 B1
(45) Date of Patent: *Nov. 17, 2015

(54) SCALABLE MIMO-OFDM PHY FOR HIGH THROUGHPUT WLANS

(71) Applicant: Marvell International Ltd., Hamilton (BM)

(72) Inventors: Ravi Narasimhan, Los Altos, CA (US); Hemanth Sampath, San Diego, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 349 days.

This patent is subject to a terminal disclaimer.

(21) Appl. No.: 13/727,882

(22) Filed: Dec. 27, 2012

Related U.S. Application Data

(60) Continuation of application No. 13/206,105, filed on Aug. 9, 2011, now Pat. No. 8,345,534, which is a division of application No. 10/896,313, filed on Jul. 20, 2004, now Pat. No. 7,995,455.

(60) Provisional application No. 60/537,973, filed on Jan. 21, 2004, provisional application No. 60/538,026, filed on Jan. 21, 2004.

(51) Int. Cl.
*H04J 11/00* (2006.01)
*H04B 1/38* (2015.01)

(52) U.S. Cl.
CPC ........................................ *H04B 1/38* (2013.01)

(58) Field of Classification Search
CPC .................. H04B 2201/70701; H04B 7/2628; H04J 2011/0003
See application file for complete search history.

(56) References Cited

U.S. PATENT DOCUMENTS

| | | | |
|---|---|---|---|
| 5,729,613 A | 3/1998 | Poletti | |
| 6,987,819 B2 | 1/2006 | Thomas et al. | |
| 7,006,810 B1 | 2/2006 | Winters et al. | |
| 7,301,924 B1 * | 11/2007 | Gurbuz et al. | 370/335 |
| 2002/0131516 A1 | 9/2002 | El-Gamal et al. | |
| 2003/0016123 A1 | 1/2003 | Tager et al. | |
| 2003/0063678 A1 * | 4/2003 | Crawford | 375/260 |
| 2003/0123381 A1 | 7/2003 | Zhuang et al. | |
| 2003/0185282 A1 | 10/2003 | Hudson | |
| 2003/0236080 A1 | 12/2003 | Kadous et al. | |

(Continued)

OTHER PUBLICATIONS

IEEE Computer Society, "TGn Sync Proposal Technical Specification", IEEE Std 802.11n—First Edition, May 2005.

(Continued)

*Primary Examiner* — Andrew Lai
*Assistant Examiner* — Zhiren Qin

(57) ABSTRACT

A transceiver comprising a transmit section and a frame formatter. The transmit section is configured to operate in a first mode and a second mode and transmit frames of data in the first mode and the second mode. The frame formatter is configured to operate in the first mode and the second mode. While operating in the first mode, the frame formatter is configured to generate a first frame of data in a first format, and the transmit section is configured to transmit a single set of long training symbols prior to transmitting the first frame of data. While operating in the second mode, the frame formatter is configured to generate a second frame of data in a second format, and the transmit section is configured to transmit a plurality of sets of long training symbols prior to transmitting the second frame of data.

14 Claims, 9 Drawing Sheets

(56) References Cited

U.S. PATENT DOCUMENTS

| | | | |
|---|---|---|---|
| 2004/0023621 A1 | 2/2004 | Sugar et al. | |
| 2004/0081073 A1* | 4/2004 | Walton et al. | 370/204 |
| 2004/0131011 A1 | 7/2004 | Sandell et al. | |
| 2005/0141407 A1 | 6/2005 | Sandhu | |
| 2005/0159115 A1 | 7/2005 | Sandhu | |
| 2006/0251193 A1* | 11/2006 | Kopmeiners et al. | 375/345 |

OTHER PUBLICATIONS

IEEE Computer Society, "IEEE Standard for Information Technology—Draft Supplement to Standard [for] Information Technology—Telecommunications and Information Exchange Between Systems—Local and Metropolitan Area Networks—Specific Requirements—Part II: Wireless LAN Medium Access Control (MAC) and Physical Layer (PHY) Specifications: Further Higher Data Rate Extension in the 2.4 GHz Band", IEEE P802.11g/D8.2, Apr. 2003, 69 Pages.

IEEE Computer Society, Std 802.11; IEEE Standard for Information technology—Telecommunications and information exchange between systems—Local and metropolitan area networks—Specific requirements; Part 11: Wireless LAN Medium Access Control (MAC) and Physical Layer (PHY) Specifications; (Revision of IEEE std 802.11-1999) dated Jun. 12, 2007; 1232 pages.

IEEE Computer Society, "Supplement to IEEE Standardfor Information Technology—Telecommunications and Information Exchange Between Systems—Local and Metropolitan Area Networks—Specific Requirements—Part II: Wireless LAN Medium Access Control (MAC) and Physical Layer (PHY) Specifications: High-speed Physical Layer in the 5 Ghz Band", IEEE Std 802.11a-1999 (Supplement to IEEE Std 802.11-1999). 91 pages.

IEEE Computer Society, "Supplement to IEEE Standardfor Information Technology—Telecommunications and Information Exchange Between Systems—Local and Metropolitan Area Networks—Specific Requirements—Part II: Wireless LAN Medium Access Control (MAC) and Physical Layer (PHY Specifications: Higher—speed Physical Layer Extension in the 2.4 Ghz Band", IEEE Std 802.11b-1999 (Supplement to IEEE Std 802.11-1999). 96 pages.

* cited by examiner $M_t=1$

| Tone | -24 | -20 | -16 | -12 | -8 | -4 | 4 | 8 | 12 | 16 | 20 | 24 |
|---|---|---|---|---|---|---|---|---|---|---|---|---|
| Tx0 | $S_{-24}$ | $S_{-20}$ | $S_{-16}$ | $S_{-12}$ | $S_{-8}$ | $S_{-4}$ | $S_4$ | $S_8$ | $S_{12}$ | $S_{16}$ | $S_{20}$ | $S_{24}$ |

FIG. 7A $M_t=2$

| Tone | -24 | -20 | -16 | -12 | -8 | -4 | 4 | 8 | 12 | 16 | 20 | 24 |
|---|---|---|---|---|---|---|---|---|---|---|---|---|
| Tx0 | $S_{-24}$ | 0 | $S_{-16}$ | 0 | $S_{-8}$ | 0 | $S_4$ | 0 | $S_{12}$ | 0 | $S_{20}$ | 0 |
| Tx1 | 0 | $S_{-20}$ | 0 | $S_{-12}$ | 0 | $S_{-4}$ | 0 | $S_8$ | 0 | $S_{16}$ | 0 | $S_{24}$ |

FIG. 7B $M_t=3$

| Tone | -24 | -20 | -16 | -12 | -8 | -4 | 4 | 8 | 12 | 16 | 20 | 24 |
|---|---|---|---|---|---|---|---|---|---|---|---|---|
| Tx0 | $S_{-24}$ | 0 | 0 | $S_{-12}$ | 0 | 0 | $S_4$ | 0 | 0 | $S_{16}$ | 0 | 0 |
| Tx1 | 0 | $S_{-20}$ | 0 | 0 | $S_{-8}$ | 0 | 0 | $S_8$ | 0 | 0 | $S_{20}$ | 0 |
| Tx2 | 0 | 0 | $S_{-16}$ | 0 | 0 | $S_{-4}$ | 0 | 0 | $S_{12}$ | 0 | 0 | $S_{24}$ |

FIG. 7C $M_t=4$

| Tone | -24 | -20 | -16 | -12 | -8 | -4 | 4 | 8 | 12 | 16 | 20 | 24 |
|---|---|---|---|---|---|---|---|---|---|---|---|---|
| Tx0 | $S_{-24}$ | 0 | 0 | 0 | $S_{-8}$ | 0 | 0 | 0 | $S_{12}$ | 0 | 0 | 0 |
| Tx1 | 0 | $S_{-20}$ | 0 | 0 | 0 | $S_{-4}$ | 0 | 0 | 0 | $S_{16}$ | 0 | 0 |
| Tx2 | 0 | 0 | $S_{-16}$ | 0 | 0 | 0 | $S_4$ | 0 | 0 | 0 | $S_{20}$ | 0 |
| Tx3 | 0 | 0 | 0 | $S_{-12}$ | 0 | 0 | 0 | $S_8$ | 0 | 0 | 0 | $S_{24}$ |

FIG. 7D

SCALABLE MIMO-OFDM PHY FOR HIGH THROUGHPUT WLANS

CROSS-REFERENCE TO RELATED APPLICATIONS

The present disclosure is a continuation of U.S. patent application Ser. No. 13/206,105 (now U.S. Pat. No. 8,345, 534), filed on Aug. 9, 2011, which is a divisional of U.S. patent application Ser. No. 10/896,313, filed on Jul. 20, 2004 (now U.S. Pat. No. 7,995,455), which claims the benefit of U.S. Provisional Application Ser. No. 60/537,973, filed on Jan. 21, 2004, and to U.S. Provisional Application Ser. No. 60/538,026, filed on Jan. 21, 2004. The entire disclosures of the applications referenced above are incorporated herein by reference.

BACKGROUND

Wireless phones, laptops, PDAs, base stations and other systems may wirelessly transmit and receive data. A single-in-single-out (SISO) system may have two single-antenna transceivers in which one predominantly transmits and the other predominantly receives. The transceivers may use multiple data rates depending on channel quality.

An $M_R \times M_T$ multiple-in-multiple-out (MIMO) wireless system uses multiple transmit antennas ($M_T$) and multiple receive antennas ($M_R$) to improve data rates and link quality. The MIMO system may achieve high data rates by using a transmission signaling scheme called "spatial multiplexing," where a data bit stream is demultiplexed into parallel independent data streams. The independent data streams are sent on different transmit antennas to obtain an increase in data rate according to the number of transmit antennas used. Alternatively, the MIMO system may improve link quality by using a transmission signaling scheme called "transmit diversity," where the same data stream (i.e., same signal) is sent on multiple transmit antennas after appropriate coding. The receiver receives multiple copies of the coded signal and processes the copies to obtain an estimate of the received data.

The number of independent data streams transmitted is referred to as the "multiplexing order" or spatial multiplexing rate ($r_s$). A spatial multiplexing rate of $r_s=1$ indicates pure diversity and a spatial multiplexing rate of $r_s=\min(M_R, M_T)$ (minimum number of receive or transmit antennas) indicates pure multiplexing.

SUMMARY

A multiple-in-multiple-out (MIMO)/orthogonal frequency-division multiplexing (OFDM) system may use different types of space-frequency code matrices for encoding data on multiple substreams for transmission on multiple antennas. The system may utilize a MIMO-OFDM frame format that includes additional long training OFDM symbols for training additional antennas and for link adaptation and a header with an additional SIGNAL symbol to indicate MIMO-OFDM-specific information.

The system may include a code module to generate a codeword vector for a tone in an OFDM symbol from a vector corresponding to the tone and a space-frequency code matrix corresponding to a particular spatial multiplexing rate. The space-frequency code matrix may enable the system to transmit tones in the OFDM symbol with equal transmit power per tone from the antennas, e.g., by using a matrix such that the Frobenius norm of the space-frequency code matrix is constant for all tones. The space-frequency code matrix may enable the system to transmit tones in the OFDM symbol with equal power per antennas, e.g., by using a matrix in which the row norm is equal for each row. The code module may employ a permuted space-frequency coding technique in which the code module cycles through permutations on a tone-by-tone basis. Alternatively, the code module may employ a generalized cyclic delay diversity technique in which the space frequency code matrix is given by the following equation:

$$B_k = k_{M_T, r_s} D_k F_{M_T, r_s},$$

where $k_{M_T, r_s}$ is the normalization constant, $F_{M_T, r_s}$ is a Fourier sub-matrix consisting of the first $r_s$ columns of an $M_T$-point discrete Fourier transform, and $D_k$ is a diagonal matrix of exponentials that are a function of a cycle delay on each of the plurality of antennas, and is given by the equation:

$$D_k = \mathrm{diag}\{e^{-j2\pi k L_i/N}\}_{i=0}^{M_T-1},$$

where $L_i$ is a cyclic delay for the i-th antenna, and N is the size of an inverse fast Fourier transform (IFFT).

The system may utilize an IEEE 802.11a-compliant frame format or a MIMO-OFDM frame format. The MIMO-OFDM frame format may include a short preamble in which tones are distributed across the antennas in a cyclic manner. The MIMO-OFDM frame format may include multiple long training symbols, e.g., one for each antenna, and an additional SIGNAL symbol including MIMO-OFDM specific information, e.g., the spatial multiplexing rate and the number of transmit antennas.

BRIEF DESCRIPTION OF DRAWINGS

FIGS. 7A-7D show examples of a transmitted MIMO-OFDM short training symbol in the frequency domain for MIMO-OFDM systems utilizing one, two, three, and four transmit antennas, respectively.

DESCRIPTION

Figure 1:
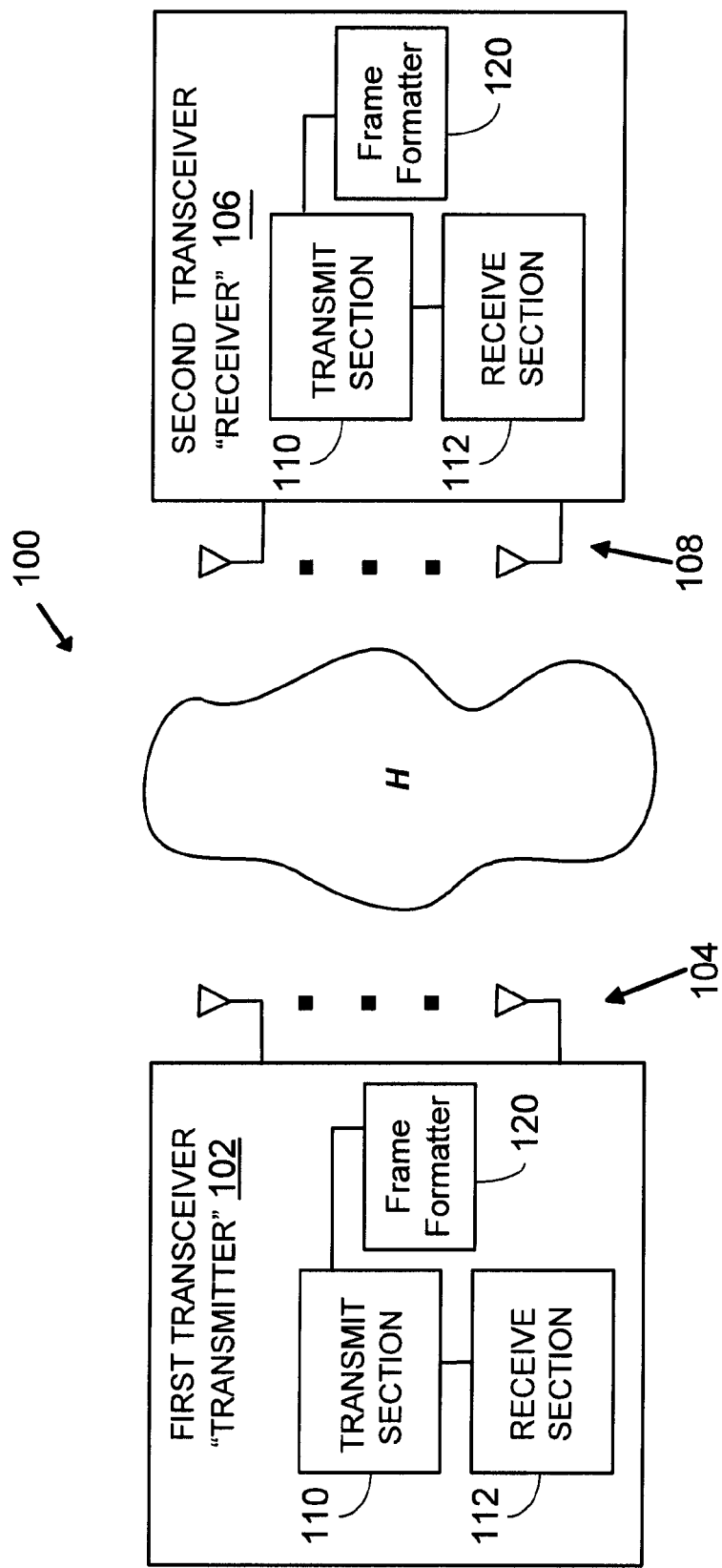
FIG. 1 is a block diagram of a wireless MIMO-OFDM communication system according to an embodiment.

FIG. 1 illustrates a wireless multiple-in-multiple-out (MIMO) communication system 100, which includes a first transceiver 102 with $M_T$ transmit ($T_X$) antennas 104 and a second transceiver 106 with $M_R$ receive ($R_X$) antennas 108, forming an $M_R \times M_T$ MIMO system. For the description below, the first transceiver 102 is designated as a "transmitter" because the transceiver 102 predominantly transmits signals to the transceiver 106, which predominantly receives signals and is designated as a "receiver". Despite the designations, both "transmitter" 102 and "receiver" 106 may include a transmit section 110 and a receive section 112 and may transmit and receive data.

The transmitter 100 and receiver 102 may be implemented in a wireless local Area Network (WLAN) that complies with the IEEE 802.11 standards (including IEEE 802.11, 802.11a, 802.11b, 802.11g, and 802.11n). The IEEE 802.11 standards describe orthogonal frequency-division multiplexing (OFDM) systems and the protocols used by such systems. In an OFDM system, a data stream is split into multiple substreams, each of which is sent over a different subcarrier frequency (also referred to as a "tone"). For example, in IEEE 802.11a systems, OFDM symbols include 64 tones (with 48 active data tones) indexed as $\{-32, -31, \ldots, -1, 0, 1, \ldots, 30, 31\}$, where 0 is the DC tone index. The DC tone is not used to transmit information.

The antennas in the transmitter 102 and receiver 106 communicate over channels in a wireless medium. In FIG. 1, H represents the reflections and multi-paths in the wireless medium, which may affect the quality of the channels. The system may perform channel estimation using known training sequences which are transmitted periodically (e.g., at the start of each frame). A training sequence may include one or more pilot symbols, i.e., OFDM symbols including only pilot information (which is known a priori at the receiver) on the tones. The pilot symbol(s) are inserted in front of each transmitted frame. The receiver 106 uses the known values to estimate the medium characteristics on each of the frequency tones used for data transmission. For example, on the receiver side, the signal $Y_k$ for tone k in an SISO system can be written as, $$Y_k = H_k Q_k + N_k,$$

where $H_k$ is the channel gain for the $k^{th}$ tone, $Q_k$ is the symbol transmitted on the $k^{th}$ tone, and $N_k$ is the additive noise. An estimate of the channel may be determined at the receiver by dividing $Y_k$ by $Q_k$.

The number of independent data streams transmitted by the transmit antennas 104 is called the "multiplexing order" or "spatial multiplexing rate" ($r_s$). A spatial multiplexing rate of $r_s=1$ indicates pure diversity, and a spatial multiplexing rate of $r_s=\min(M_R, M_T)$ (minimum number of receive or transmit antennas) indicates pure multiplexing.

In an embodiment, the MIMO system 100 may use combinations of diversity and spatial multiplexing, e.g., $1 \leq r_s \leq \min(M_R, M_T)$. For example, in a 4×4 MIMO system, the system may select one of four available multiplexing rates ($r_s \in [1, 2, 3, 4]$) depending on the channel conditions. The system may change the spatial multiplexing rate as channel conditions change.

Figure 2:
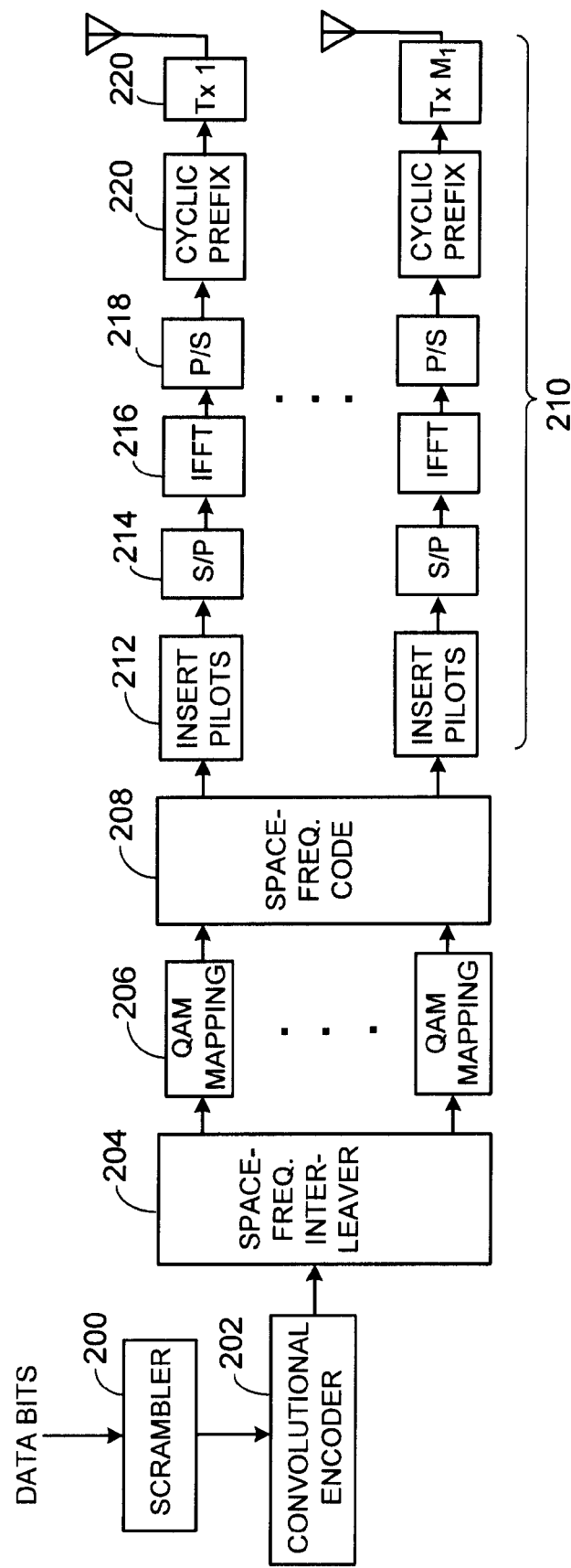
FIG. 2 is a block diagram of a transmit section in a transceiver in the MIMO-OFDM communication system.

FIG. 2 shows a block diagram of the transmit section 110. The transmit section 110 includes stages similar to those in the transmit section of an IEEE 802.11a transmitter, but with some modifications to account for the multiple transmit antennas.

Data bits in a data stream to be transmitted are scrambled by a scrambler 200 and then encoded by a convolutional encoder 202. A space-frequency interleaver 204 interleaves and separates the single data stream into $M_T$ substreams. Quadrature amplitude modulation (QAM) constellation mapping may be performed on each substream by mapping modules 206. The mapped substreams are then encoded using a linear space-frequency coding module 208, the operation of which is described in more detail below. Each of the individual substreams are processed in a corresponding processing chain 210. Each processing chain includes a pilot symbol insertion module 212, a serial-to-parallel (S/P) converter 214, an inverse fast Fourier transform (IFFT) module 216, a parallel-to-serial (P/S) converter 218, a cyclic prefix module 220, and a radio frequency (RF) module 222 for digital-to-analog (D/A) and baseband-to-RF conversion.

Figure 3:
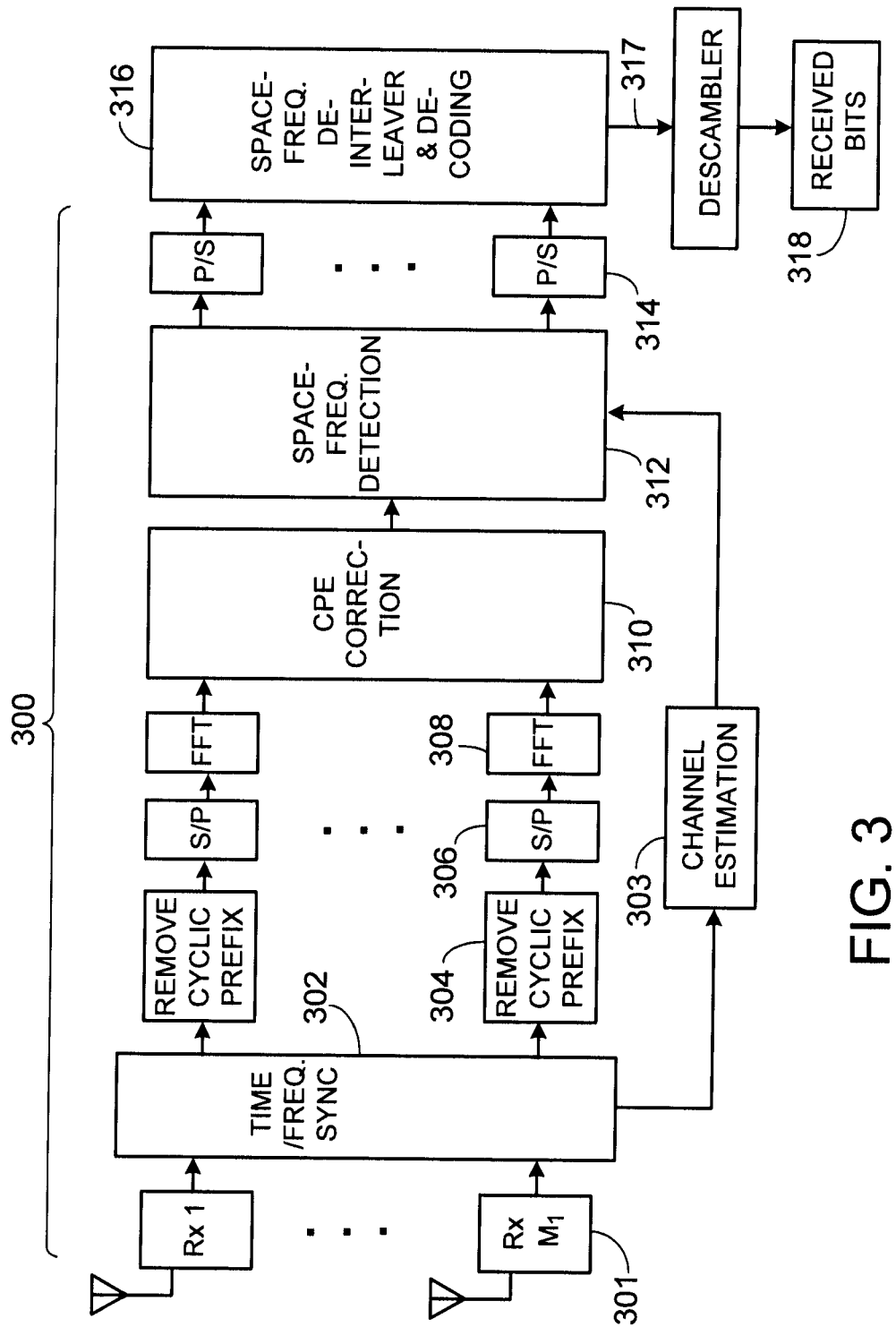
FIG. 3 is a block diagram of the receive section in a transceiver in the MIMO-OFDM communication system.

FIG. 3 shows a block diagram of the receive section 112. The receive section 112 includes stages similar to those in the receive section of an IEEE 802.11a receiver, but with some modifications to account for the multiple receive antennas.

Signals received on the multiple receive antennas are input to corresponding processing chains 300. Each processing chain includes an RF module 301 for RF-to-baseband and analog-to-digital (A/D) conversion. A time/frequency synchronization module 302 performs synchronization operations and extracts information from the multiple substreams for channel estimation 303. Each processing chain 300 includes a cyclic prefix removal module 304, S/P converter 306, fast Fourier transform (FFT) module 308, a common phase error (CPE) correction module 310, a space-frequency detection module 312, and a P/S converter 314. The multiple substreams are input to a space-frequency deinterleaver and decoding module 316 which de-interleaves the substreams into a single data stream 317 and performs soft decoding. The single stream is then input to a descrambler 318.

Figure 4:
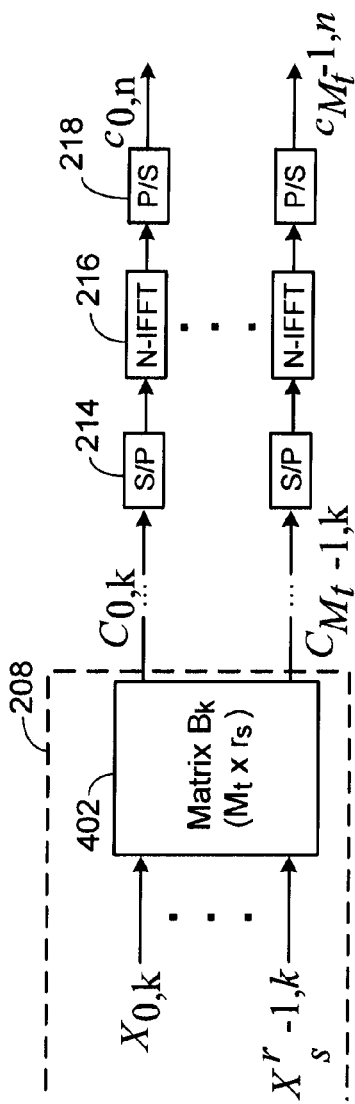
FIG. 4 is block diagram of a portion of a space-frequency code module in the transmit section of FIG. 2.

The space-frequency code module 208 in the transmit section 110 generates codewords for the different substreams. For a given spatial multiplexing rate ($r_s$), a vector X of modulated symbols for each tone is defined, as shown in FIG. 4. For the k-th tone, this vector is given by:

$$X_k = [X_{0,k} \ldots X_{r_s-1,k}]^T.$$

The codeword vector $C_k$ for the k-th tone is given by:

$$C_k = [C_{0,k} \ldots C_{M_T-1,k}]^T.$$

The codeword vector $C_k$ may be calculated in a codeword generator 402 by multiplying the vector $X_k$ by the $M_T \times r_s$ space-frequency code matrix for the k-th tone ($B_k$), i.e., $$C_k = B_k X_k.$$

The codeword $C_k$ is output to the processing chains 210, and an IFFT operation is performed on the codeword vector to generate the time domain codeword $c_n$, where $$c_n = [c_{0,n} \ldots c_{M_T-1,n}]^T.$$

In an embodiment, the code matrix $B_k$ is selected such that there is equal transmit power per tone and equal transmit power for each antenna. To produce equal transmit power per tone, the sum of the squares of all elements in the matrix, i.e., the Frobenius norm of code matrix $B_k$, must constant for all tones, i.e., $$\|B_k\|_F^2 = \text{const.}, k=0, \ldots, N_u-1$$

where $N_u$ is the number of used tones (subcarriers), e.g., 52 tones for IEEE 802.11a compatible systems.

To produce equal transmit power per antenna, the row norms summed across all tones must be equal for each of the rows, i.e., $$\sum_{k=0}^{N_u-1} (B_k B_k^H) i, i = \text{const.}, i=0, \ldots, M_T-1.$$

Utilizing equal transmit power per antenna may be useful in minimizing the cost of the power amplifier (PA) in the transmitter.

Different types of space-frequency encoding may be implemented by the space-frequency code module 208. In an embodiment, permuted space-frequency codes (also referred to as "antenna tone hopping") may be used. In antenna tone hopping, symbols are transmitted on the multiple transmit antennas such that each tone has only one antenna active for $r_s=1$. The space-frequency code module 208 may cycle through different permutations of tone-antenna mappings, e.g., on a tone-by-tone basis. For example, for a system with three transmit antennas ($M_T=3$) and using pure diversity spatial multiplexing ($r_s=1$), the code matrix is given by $$B_k \in \left\{ c_{31} \begin{bmatrix} 1 \\ 0 \\ 0 \end{bmatrix}, c_{31} \begin{bmatrix} 0 \\ 1 \\ 0 \end{bmatrix}, c_{31} \begin{bmatrix} 0 \\ 0 \\ 1 \end{bmatrix} \right\},$$

where $c_{31}$ is a normalization constant. In this example, the permutations include, from left to right, (1) only antenna Tx0 transmitting tone k, (2) only antenna Tx1 transmitting tone k, and (3) only antenna Tx2 transmitting tone k, respectively. The space-frequency code module 208 may cycle through these permutations on a tone-by-tone basis.

Similarly, for a system with $M_T=3$ and $r_s=2$, the code matrix is given by $$B_k \in \left\{ c_{32} \begin{bmatrix} 1 & 0 \\ 0 & 1 \\ 0 & 0 \end{bmatrix}, c_{32} \begin{bmatrix} 0 & 0 \\ 1 & 0 \\ 0 & 1 \end{bmatrix}, c_{32} \begin{bmatrix} 0 & 1 \\ 0 & 0 \\ 1 & 0 \end{bmatrix} \right\},$$

wherein $c_{32}$ is a normalization constant. In this example, the permutations include, from left to right, (1) antenna Tx0 transmitting tone k in the first substream and antenna Tx1 transmitting tone k in the second substream, (2) antenna Tx1 transmitting tone k in the first substream and antenna Tx2 transmitting tone k in the second substream, and (3) antenna Tx2 transmitting tone k in the first substream and antenna Tx0 transmitting tone k in the second substream, respectively. Other permutations may be possible.

Another type of space-frequency encoding that may be implemented by the space-frequency code module 208 is generalized cyclic delay diversity. In this encoding technique, substreams are switched between antennas on a cyclic basis. For example, symbol A may be transmitted on antenna Tx0, and then on antenna Tx1 after a cyclic delay $L_2$, and then on antenna Tx2 after a cyclic delay $L_3$. The code matrix $B_k$ is given by:

$$B_k = k_{M_T,r_s} D_k F_{M_T,r_s}$$

where $k_{M_T,r_s}$ is the normalization constant, $D_k$ is a diagonal matrix, and $F_{M_T,r_s}$ is a Fourier sub-matrix consisting of the first $r_s$ columns of an $M_T$-point discrete Fourier transform matrix. In addition to the Fourier matrix, other matrices may be used, including Vandermonde, Hadamard, or Walsh matrices. $D_k$ is a diagonal matrix of exponentials that are a function of the cycle delay on each of the transmit antennas, and is given by $$D_k = \text{diag}\{e^{-j2\pi k L_i/N}\}_{i=0}^{M_T-1},$$

where $L_i$ is the cyclic delay for the i-th antenna, and N is the size of the IFFT.

Figure 5:
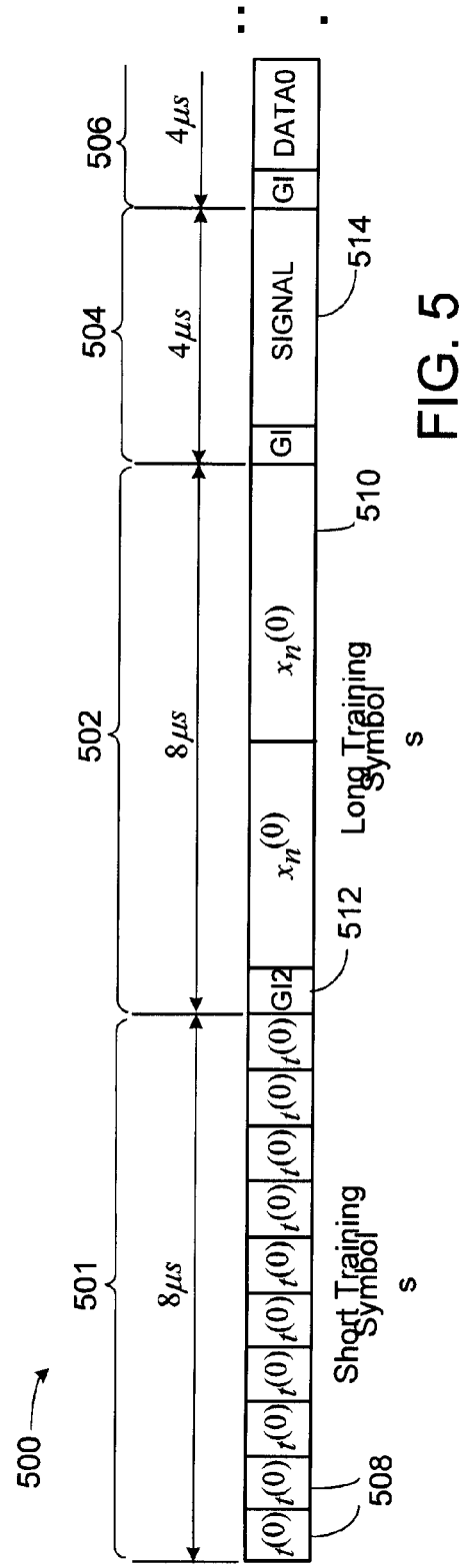
FIG. 5 illustrates an IEEE 802.11a frame format.

The MIMO-OFDM system may be compatible with IEEE 802.11a systems, and consequently may have many similarities to an IEEE 802.11a system. For example, like IEEE 802.11a systems, the MIMO-OFDM system may use 52 tones (48 data tones and 4 pilot tones), 312.5 kHz subcarrier spacing, a FFT/IFFT period of 3.2 ρs, a cyclic prefix with a duration of 0.8 μs, and an OFDM symbol duration of 4.0 μs. The MIMO-OFDM system may also use a frame format similar to that specified by IEEE 802.11a, which is shown in FIG. 5. In addition, variations of the MIMO-OFDM systems are also possible, including using different numbers of tones, different guard intervals, different forward error correction codes, and different constellations.

An IEEE 802.11a frame 500 includes a short preamble 501, a long preamble 502, a header 504, and a DATA field 506. The short preamble 501 consists of a short training symbol 508 with a duration of 0.8 μs repeated ten times. The short preamble 501 is used for signal detection, automatic gain control (AGC), coarse frequency offset estimation, and symbol timing estimation.

The long preamble 502 includes two long training symbols 510, each of duration 3.2 vs, which are separated from the short training symbols 508 by a long guard interval (1.6 μs) 512.

The header 504 includes a SIGNAL symbol 514, which is encoded at 6 Mbps. The SIGNAL symbol 514 is 12 bits in length and includes 4 bits for the data rate, 1 reserved bit, 1 parity bit, and 6 tail bits (set to "0" to return the convolutional decoder to State 0).

The DATA field 506 includes OFDM symbols including the data bits to be transmitted. The data bits are prepended by a 16-bit SERVICE field and are appended by 6 tail bits. The resulting bits are appended by a number of pad bits needed to yield an integer number of OFDM symbols.

Figure 6:
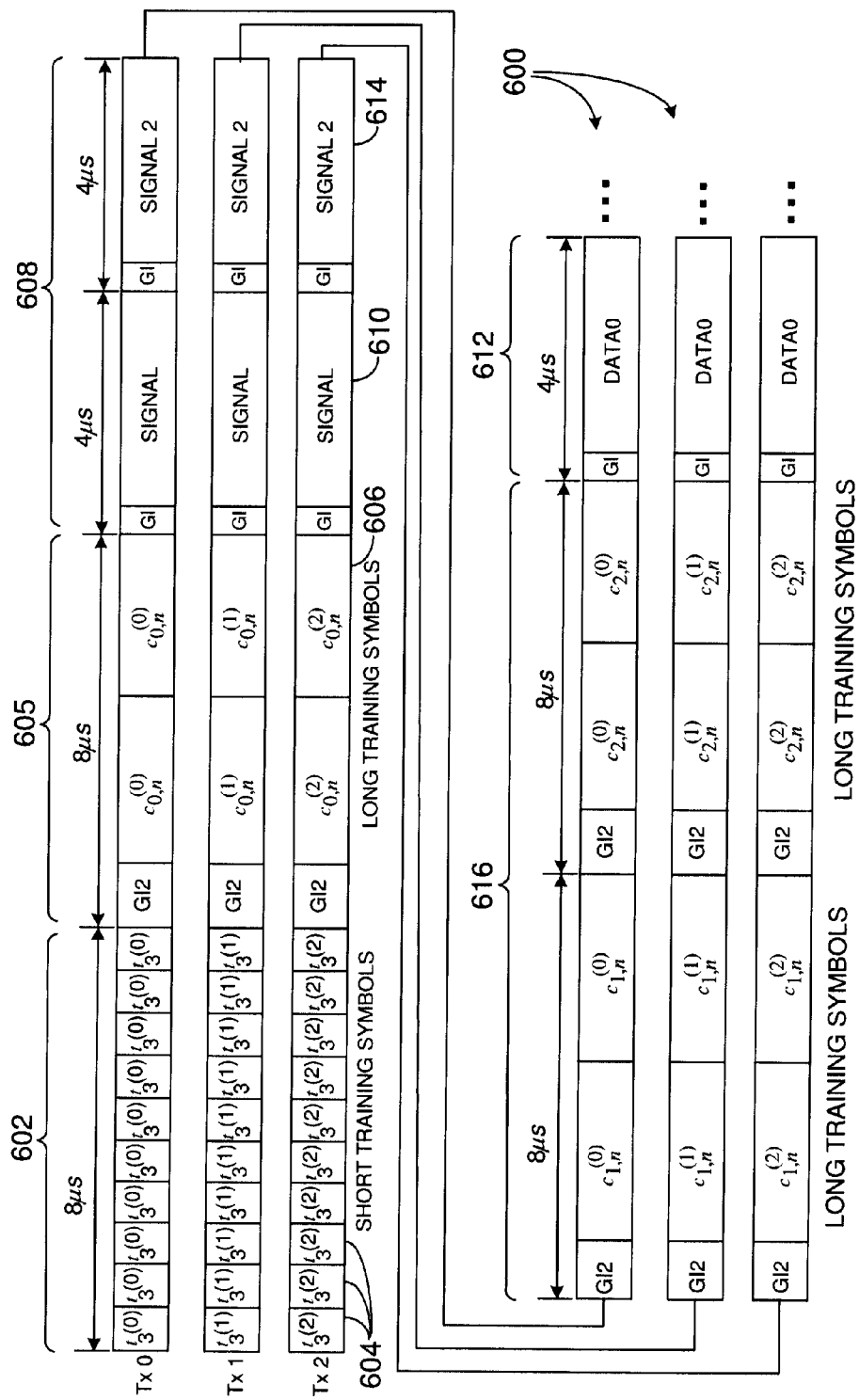
FIG. 6 illustrates a frame format for the MIMO-OFDM communication system.

The MIMO-OFDM system may use a similar frame format, as shown in FIG. 6. The illustrated frame format 600 is for systems with three transmit antennas ($M_T=3$), but can be modified for other $M_T$. A frame formatter 120 (FIG. 1) in the transmitter 102 may use components in the transmit data path shown in FIG. 2 to generate and process different sections of the frame for transmission from the transmit antennas.

Each transmit antenna transmits a different MIMO-OFDM frame 600. Like the IEEE 802.11a frame 500, the MIMO-OFDM frames 600 include a short preamble 602 with a series of short training symbols 604, a long preamble 605 with a set of two long training symbols 606, a header 608 including a SIGNAL symbol 610, and a data field 612. In addition, the header 608 may include a second SIGNAL symbol (SIGNAL2) 614, which may be used to transmit MIMO-OFDM-specific information, such as the number of transmit antennas and the spatial multiplexing rate. The frame may also include a supplemental long preamble 616 including $M_T-1$ additional long training symbols to train the other antennas.

As in IEEE 802.11a, a short OFDM training symbol consists of 12 tones, which are modulated by the elements of the following frequency-domain sequence:

$$S_{-26,26} =$$

$$\sqrt{\frac{13}{6}} \times \{0, 0, 1+j, 0, 0, 0, -1-j, 0, 0, 0, 1+j, 0, 0, 0, -1-j, 0, 0, 0,$$

$$-1-j, 0, 0, 0, 1+j, 0, 0, 0, 0, 0, 0, 0, -1-j, 0, 0, 0, -1-j,$$

$$0, 0, 0, 1+j, 0, 0, 0, 1+j, 0, 0, 0, 1+j, 0, 0, 0, 1+j, 0, 0\}$$

The multiplication by $$\sqrt{13/6}$$

is in order to normalize the average power of the resulting OFDM symbol. The short training symbol has a duration of 0.8 μs and is repeated 10 times.

In an embodiment, different tones in the short training symbol may be transmitted on different antennas. FIGS. 7A-7D show examples of a transmitted MIMO-OFDM short training symbol in the frequency domain for $M_T=1, 2, 3, 4$, respectively.

For $M_T=1$, all tones are transmitted on one antenna, Tx0, as shown in FIG. 7A. The short training symbol in this case is the same as the IEEE 802.11a short training symbol. For $M_T>1$, a cyclic transmission technique may be used in which the tones are transmitted on different antennas in a cyclic manner. As shown in FIG. 7B, for $M_T=2$, six subcarriers are transmitted on each of the two antennas, Tx0 and Tx1. Similarly, for $M_T=3$, four subcarriers are transmitted on each of antennas Tx0, Tx1, and Tx2, as shown in FIG. 7C, and for $M_T=4$, three subcarriers are transmitted on each of the antennas Tx0, Tx1, Tx2, and Tx3. In this manner, the short training symbols may be transmitted with equal power per transmit antenna, which may facilitate the use of low-power power amplifiers in the transmitter. Also, the cyclic transmission technique produces no cross-correlation across transmit antennas, which may facilitate improved AGC performance at the receiver. The short preamble 602 is compatible with IEEE 802.11a receivers for $M_T \geq 1$ because the standard 802.11a receiver can receive and use all tones regardless of whether they were transmitted on one or more antennas.

As in IEEE 802.11a, the long preamble 602 is used for fine frequency offset estimation and channel estimation. A long training OFDM symbol includes 52 tones, which are modulated by the following frequency-domain BPSK training sequence:

$$L_{-26,26}=\{1,1,-1,-1,1,1,-1,1,-1,1,1,1,1,1,1,-1,-1,1,1,-1,1,-1,1,1,1,1,0,1,-1,-1,1,1,-1,1,-1,1,-1,-1,1,-1,-1,1,1,-1,-1,1,-1,1,1,1,1\}$$

The number of sets of long training symbols may be $M_T$ for all spatial multiplexing rates. The additional long training symbols may be used to estimate the full $M_R \times M_T$ channel matrix. This estimation may be used for link adaptation, in which modulation, coding rate, and/or other signal transmission parameters may be dynamically adapted to the changing channel conditions. However, for compatibility with IEEE 802.11a systems, the transmitter may also operate in a legacy mode in which only one set of long training symbols is transmitted on all antennas, i.e., the supplemental long preamble 616 is omitted. In the legacy mode, the SIGNAL2 symbol 614 may also be omitted, such that the data starts after the SIGNAL symbol 610.

The preamble may be generated from $r_s$ frequency domain input symbols, $p=0, \ldots, r_{s-1}$. For data tones in the long preamble section, the vector X is given by:

$$X_k^{(p)}=[0 \ldots 0 \, L_k \, 0 \ldots 0]^T,$$

where $L_k$ is positioned at the p-th position in the vector.

For pilot tones in the long preamble section, the vector X is given by:

$$X_k^{(p)}=[L_k \, 0 \ldots 0]$$

The frequency-domain preamble may then be generated by multiplying the vector X by the matrix $B_k$, i.e., $$C_k^{(p)}=B_k^{(p)} X_k^{(p)}$$

The time-domain preamble p for the i-th antenna is given by:

$$c_{p,n}^{(i)}.$$

The additional long training symbols in the supplemental long preamble 616 may be generated from input symbols $p=r_s, \ldots, M_T-1$ by multiplying $L_k$ with $(M_T-r_s)M-1$ mutually orthogonal column vectors that are orthogonal to the columns of $B_k$.

Data bits in the data field 612 are scrambled, convolutionally encoded, and interleaved before mapping onto subcarrier constellations in a manner similar to that specified in IEEE 802.11a. To account for the availability of multiple spatial multiplexing rates, the interleaving may be performed by a block interleaver with a block size equal to the number of coded bits per spatial substream in an OFDM symbol.

As in IEEE 802.11a, tones $k=-21, -7, 7$, and 21 are used for pilot tones in each data MIMO-OFDM symbol. The pilot tones consist of modulating the first spatial substream with IEEE 802.11a MPSK pilot tone sequence followed by multiplication by code matrix $B_k$. The dimension of $B_k$ for pilot tones is $M_T \times 1$. The matrix $B_k$ for each pilot tones may be selected to maintain equal power per transmit antenna.

Figure 8:
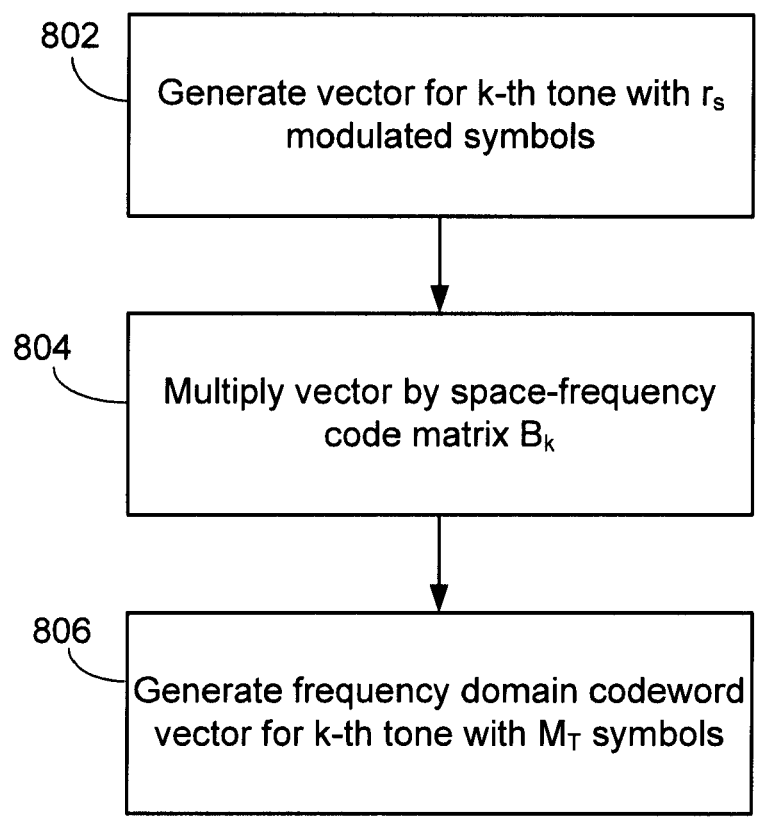
FIG. 8 is a flowchart describing a space-frequency coding operation according to an embodiment.

FIG. 8 is a flowchart describing a space-frequency coding operation 800 according to an embodiment. The codeword generator 402 (FIG. 4) in the space-frequency code module 208 receives a vector for the n-th tone having $r_s$ modulated symbols (block 802). The codeword generator 402 multiplies the vector for the k-th tone by the space-frequency code matrix $B_k$ (block 804). As described above, $B_k$ is selected to produce equal transmit power for each tone and equal transmit power for each antenna, and may be different depending on the type of space-frequency encoding being performed (e.g., antenna-tone hopping or generalized cyclic delay diversity). The codeword generator 402 then outputs the frequency domain codeword vector for the k-th tone (block 806), which has $M_T$ symbols corresponding to the $M_T$ transmit antennas.

Figure 9:
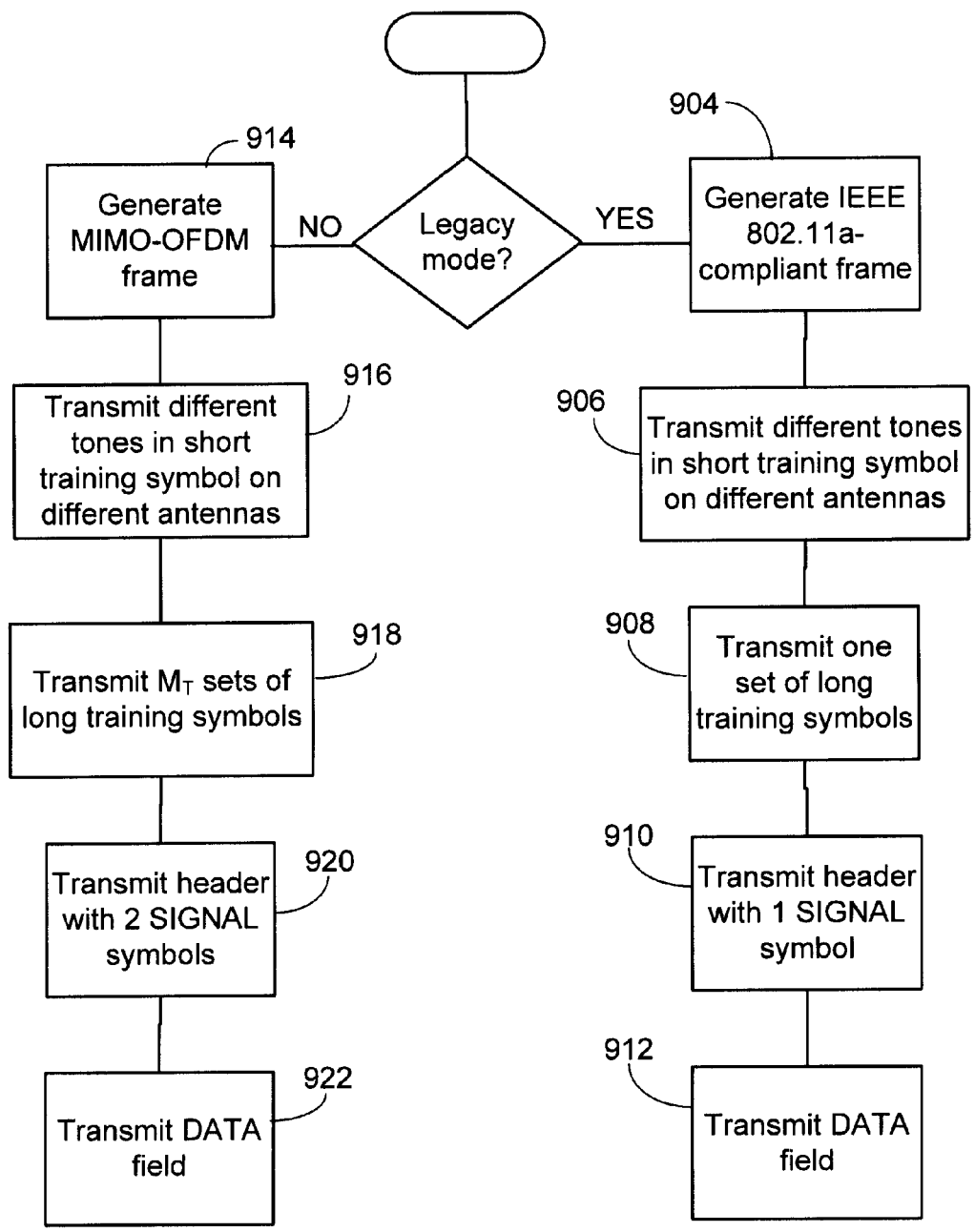
FIG. 9 is a flowchart describing the operation of the frame formatter in an IEEE 802.11a-compliant mode and a MIMO-OFDM mode.

As described above, the frame formatter 120 MIMO-OFDM transmitter may be operated in a MIMO-OFDM mode and a legacy mode for compatibility with IEEE 802.11a systems. FIG. 9 is a flowchart describing the operation of the frame formatter in the two modes. If the frame formatter is in the legacy mode (block 902), the frame formatter generates an IEEE 802.11a-compliant frame (block 904). The frame has a format in which different tones in the short training symbol may be transmitted on different antennas, e.g., in a cyclic distribution (block 906). In the IEEE 802.11a-compliant mode, the transmitter may transmit only one set of long training symbols (block 908) and a header with only one SIGNAL symbol (block 910). Finally, the transmitter transmits the frame's DATA field (block 912).

If the frame formatter is in the MIMO-OFDM mode (block 902), the frame formatter generates a MIMO-OFDM frame (block 914). The frame has a format in which different tones in the short training symbol may be transmitted on different antennas, e.g., in a cyclic distribution (block 916). In the MIMO-OFDM mode, the transmitter may transmit multiple sets of long training symbols, one for each of the $M_T$ transmit antennas (block 918) to facilitate link adaptation and a header with only two SIGNAL symbols (block 920), including one SIGNAL symbol with MIMO-OFDM-specific information. Finally, the transmitter transmits the frame's DATA field (block 922).

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

What is claimed is:

1. A transceiver configured to operate in each of a first mode and a second mode, the transceiver comprising:
   a transmit section configured to i) operate in each of the first mode and the second mode, and ii) transmit frames of data while operating in each of the first mode and the second mode; and a frame formatter configured to (i) operate in each of the first mode and the second mode and (ii) determine which of the first mode and the second mode the transceiver is operating in, wherein, in response to a determination that the transceiver is operating in the first mode,
- i) the frame formatter is configured to generate a first frame of data in a first format, and
- ii) the transmit section is configured to transmit a single set of long training symbols prior to transmitting the first frame of data, and in response to a determination that the transceiver is operating in the second mode,
- i) the frame formatter is configured to generate a second frame of data in a second format, and
- ii) the transmit section is configured to transmit a plurality of sets of long training symbols prior to transmitting the second frame of data, and wherein the transmit section is configured to, while operating in each of the first mode and the second mode, transmit a plurality of tones of a short training symbol of a corresponding one of the first frame of data and the second frame of data using different respective antennas.

2. The transceiver of claim 1, wherein the single set of long training symbols and the plurality of sets of long training symbols include pilot symbols.

3. The transceiver of claim 1, wherein the first format corresponds to an 802.11 compliant format, and the second format corresponds to a multiple-in-multiple-out (MIMO) format.

4. The transceiver of claim 1, wherein the transmit section is configured to transmit, subsequent to transmitting the single set of long training symbols in the first mode, a header including a single control data field.

5. The transceiver of claim 1, wherein the transmit section is configured to transmit, subsequent to transmitting the plurality of sets of long training symbols in the second mode, a header including a plurality of control data fields.

6. The transceiver of claim 5, wherein at least one of the plurality of control data fields includes information corresponding to the second format.

7. The transceiver of claim 1, wherein a number of the plurality of sets of long training symbols corresponds to a number of transmit antennas associated with the transmit section.

8. A method of operating a transceiver configured to operate in each of a first mode and a second mode, wherein the transceiver includes a transmit section and a frame formatter, the method comprising:

operating each of the transmit section and the frame formatter in a selected mode of the first mode and the second mode;

transmitting frames of data, via the transmit section, while the transmit section is operating in each of the first mode and the second mode; and determining whether the selected mode corresponds to the first mode or the second mode;

wherein transmitting frames, via the transmit section, of data while operating in each of the first mode and the second mode includes
- in response to a determination that the transceiver is operating in the first mode, i) generating, via the frame formatter, a first frame of data in a first format, and ii) transmitting, via the transmit section, a single set of long training symbols prior to transmitting the first frame of data, and
- in response to a determination that the transceiver is operating in the second mode, i) generating, via the frame formatter, a second frame of data in a second format, and ii) transmitting, via the transmit section, a plurality of sets of long training symbols prior to transmitting the second frame of data, and
- while operating in each of the first mode and the second mode, transmitting, via the transmit section, a plurality of tones of a short training symbol of a corresponding one of the first frame of data and the second frame of data using different respective antennas.

9. The method of claim 8, wherein the single set of long training symbols and the plurality of sets of long training symbols include pilot symbols.

10. The method of claim 8, wherein the first format corresponds to an 802.11 compliant format, and the second format corresponds to a multiple-in-multiple-out (MIMO) format.

11. The method of claim 8, further comprising transmitting, subsequent to transmitting the single set of long training symbols while operating in the first mode, a header including a single control data field.

12. The method of claim 8, further comprising transmitting, subsequent to transmitting the plurality of sets of long training symbols while operating in the second mode, a header including a plurality of control data fields.

13. The method of claim 12, wherein at least one of the plurality of control data fields includes information corresponding to the second format.

14. The method of claim 8, wherein a number of the plurality of sets of long training symbols corresponds to a number of transmit antennas associated with the transceiver.

* * * * *